3,216,994
7-GLYCINE KALLIDIN AND INTERMEDIATES FOR THE PREPARATION THEREOF
Miklos Bodanszky, Princeton, Miguel A. Ondetti, Highland Park, and John T. Sheehan, Middlesex, N.J., assignors to Olin Mathieson Chemical Corporation, New York, N.Y., a corporation of Virginia
No Drawing. Filed Apr. 25, 1962, Ser. No. 189,964
2 Claims. (Cl. 260—112.5)

This invention relates to new peptides, and more particularly to the new decapeptide, L-lysyl-L-arginyl-L-prolyl-L-prolyl-glycyl-L-phenylalanyl - glycyl - L - prolyl-L-phenylalanyl-L-arginine (hereinafter called 7-glycine kallidin) and to a new intermediate from which it is made.

7-glycine kallidin, the new final product of this invention, is a biologically active material, which possesses the same qualitative activity as does bradykinin. The fact that the compound does have such activity is surprising, since it is well known that the biological activity of polypeptides, such as bradykinin is strictly dependent on the total structure of the compound and that even minor deviations from this structure lead to a complete loss or a substantial decrease in activity.

7-glycine kallidin is prepared, according to the process of this invention, from the nonapeptide 6-glycine bradykinin as more fully detailed in the following examples.

The following examples illustrate the process of this invention (all temperatures being in centigrade):

EXAMPLE 1

*Methyl bisbenzyloxycarbonyl - L - lysyl-nitro-L-arginyl-L-prolyl - L-prolylglycyl-L-phenylalanylglycyl-L-prolyl-L-phenylalanyl-nitro-L-argininate*

The protected nonapeptide methyl Nα-benzyloxycarbonyl - nitro - L - arginyl - L - prolyl - L - prolylglycyl - L-phenylalanyl-glycyl-L-prolyl - L - phenylalanyl - nitro-L-argininate (prepared as described in our application, Serial No. 169,639, filed January 29, 1962) is suspended in acetic acid and treated with HBr in acetic acid. After one hour at room temperature the solvent and excess HBr and the benzyl bromide formed are removed from the frozen state in vacuo. The residue is dissolved in dimethylformamide, the solution is made alkaline by the addition of triethylamine, finally bis-benzyloxycarbonyl-L-lysine p-nitrophenyl ester is added to the reaction mixture. After two days at room temperature the mixture is diluted with ethyl acetate and acetonitrile and the soluion is washed with ½ N HCl, with water and dried over MgSO$_4$. The solvents are removed in vacuo and the residue is triturated with ethyl acetate, whereupon it solidifies.

EXAMPLE 2

*L-lysyl-L-arginyl-L-propyl-L-prolylglycyl-L-phenylalanylglycyl - L - prolyl-L-phenylalanyl-L-arginine (7-glycine kallidin)*

The protected nonapeptide prepared in Example 1 is dissolved in methanol and treated with dilute NaOH for two hours at room temperature. On acidification a protected nonapeptide acid separates. The latter is dissolved in a mixture of acetic acid and water and hydrogenated at room temperature in the presence of a Pd on BaSO$_4$ catalyst. After the removal of the catalyst the solvents are removed from the frozen state in vacuo. The residue consisting of 7-glycine kallidin shows the biological properties of kallidin.

The invention may be be variously otherwise embodied within the scope of the appended claims.

What is claimed is:
1. L-lysyl-L-arginyl - L - prolyl - L - prolyl - glycyl-L-phenylalanyl-glycyl-L-prolyl-L-phenylalanyl-L-arginine.
2. Methyl bis - benzyloxycarbonyl - L - lysyl-nitro-L-arginyl-L-prolyl-L-prolyl - glycyl - L - phenylalanyl - glycyl-L-prolyl-L-phenylalanyl-nitro-L-argininate.

References Cited by the Examiner

Collier: Scientific American, vol. 207, pp. 111–118 (1962).
Greenberg: Amino Acids and Proteins, pp. 863–866 (1951).
Greenstein: Chemistry of the Amino Acids, vol. 2, pp. 887–900, 1068–1075, and 1048–1056 (1961).
Werle: Chem. Abs., vol. 45, p. 3437 (1950).

LEWIS, GOTTS, *Primary Examiner*.
LEON ZITVER, *Examiner*.